US010977060B2

United States Patent
Sukhyani et al.

(10) Patent No.: US 10,977,060 B2
(45) Date of Patent: *Apr. 13, 2021

(54) NATIVE EXECUTION BRIDGE FOR SANDBOXED SCRIPTING LANGUAGES

(71) Applicant: Atlassian Pty Ltd, Sydney (AU)

(72) Inventors: Kapil Sukhyani, Milpitas, CA (US); Shilpa Modi, San Jose, CA (US); Shuai Li, Sunnyvale, CA (US); Noam Bar-On, San Jose, CA (US); Bharath Booshan, Santa Clara, CA (US); Jerry Cheng, Mountain View, CA (US); Jonathan Zazove, Berkeley, CA (US)

(73) Assignee: ATLASSIAN PTY LTD., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,579

(22) Filed: Aug. 13, 2019

(65) Prior Publication Data

US 2019/0370040 A1    Dec. 5, 2019

Related U.S. Application Data

(63) Continuation of application No. 15/880,344, filed on Jan. 25, 2018, now Pat. No. 10,394,584.

(Continued)

(51) Int. Cl.
*G06F 9/44* (2018.01)
*G06F 21/53* (2013.01)
(Continued)

(52) U.S. Cl.
CPC ........... *G06F 9/45529* (2013.01); *G06F 8/40* (2013.01); *G06F 8/76* (2013.01); *G06F 9/44589* (2013.01);
(Continued)

(58) Field of Classification Search
CPC ............. G06F 9/45529; G06F 9/45508; G06F 9/4552; G06F 9/4484; G06F 9/468;
(Continued)

(56) References Cited

U.S. PATENT DOCUMENTS 8,271,995 B1 * 9/2012 Papakipos ............... G06F 21/51
719/310
8,978,106 B2 * 3/2015 Swamy .................. G06F 21/629
726/4

(Continued)

OTHER PUBLICATIONS

Matthias Keil et al., Transaction-based Sandboxing for JavaScript, Mar. 2016, [Retrieved on Nov. 24, 2020]. Retrieved from the internet: <URL: https://arxiv.org/pdf/1612.00669.pdf> 50 pp. 1-50 (Year: 2016).*

(Continued)

*Primary Examiner* — Anibal Rivera
(74) *Attorney, Agent, or Firm* — Brownstein Hyatt Farber Schreck, LLP

(57) ABSTRACT

Techniques herein include receiving, at a scripting language component, a request to execute one or more scripting language commands, and sending the commands from the scripting language component to a native execution component for determination, based at least in part on a security policy, whether to execute the one or more scripting language commands as corresponding native commands outside the scripting language component. In response to determining to execute the commands, the commands are translated into one or more native commands and are executed. In some embodiments, the scripting language component determines, based on a security policy, whether commands are permissible, and only if they are, forwards the commands to the native execution component for translation and execution.

20 Claims, 5 Drawing Sheets

Related U.S. Application Data

(60) Provisional application No. 62/607,109, filed on Dec. 18, 2017.

(51) Int. Cl.

| | |
|---|---|
| *G06F 11/36* | (2006.01) |
| *G06F 9/455* | (2018.01) |
| *G06F 8/76* | (2018.01) |
| *G06F 8/40* | (2018.01) |
| *G06F 21/70* | (2013.01) |
| *G06F 9/445* | (2018.01) |
| *G06F 8/34* | (2018.01) |
| *G06F 8/65* | (2018.01) |
| *G06F 17/00* | (2019.01) |
| *G06F 9/448* | (2018.01) |
| *G06F 8/30* | (2018.01) |
| *G06F 8/70* | (2018.01) |

(52) U.S. Cl.
CPC ........ *G06F 9/4552* (2013.01); *G06F 9/45508* (2013.01); *G06F 9/45512* (2013.01); *G06F 21/53* (2013.01); *G06F 21/70* (2013.01); *G06F 8/30* (2013.01); *G06F 8/34* (2013.01); *G06F 8/65* (2013.01); *G06F 8/70* (2013.01); *G06F 9/4484* (2018.02); *G06F 11/362* (2013.01); *G06F 17/00* (2013.01)

(58) Field of Classification Search
CPC .... G06F 9/45512; G06F 9/541; G06F 9/5077; G06F 8/40; G06F 8/76; G06F 8/34; G06F 8/65; G06F 21/53; G06F 21/70; G06F 11/362; G06F 17/00; G06F 9/4881; G06F 9/445; G06F 9/455; G06F 9/44589; G06F 8/30; G06F 8/70; G06F 8/64; G06F 8/36; G06F 21/629; G06F 21/60; G06F 11/3684; G06F 11/3688
See application file for complete search history.

(56) References Cited

U.S. PATENT DOCUMENTS

| | | | | |
|---|---|---|---|---|
| 9,176,754 B2* | 11/2015 | Kokkevis | ............ | G06F 9/44589 |
| 9,268,668 B1* | 2/2016 | Lachwani | ............ | G06F 11/3688 |
| 9,329,879 B2 | 5/2016 | Shah | | |
| 9,367,415 B1* | 6/2016 | Lachwani | ............ | G06F 11/3684 |
| 9,921,860 B1* | 3/2018 | Banga | ................... | G06F 9/5027 |
| 10,033,747 B1* | 7/2018 | Paithane | ................ | G06F 21/54 |
| 10,425,463 B2* | 9/2019 | Michael | .................. | G06F 9/545 |
| 2008/0148298 A1* | 6/2008 | Chatterjee | ............... | G06F 21/53 |
| | | | | 719/328 |
| 2009/0282474 A1* | 11/2009 | Chen | ....................... | G06F 21/51 |
| | | | | 726/21 |
| 2010/0287618 A1* | 11/2010 | Howell | .................. | G06F 21/53 |
| | | | | 726/26 |
| 2011/0073107 A1* | 3/2011 | Rodman | ................ | G16H 20/40 |
| | | | | 128/201.21 |
| 2011/0283363 A1* | 11/2011 | Verschoor | ........... | H04L 12/2818 |
| | | | | 726/26 |
| 2011/0296412 A1* | 12/2011 | Banga | ................... | G06F 9/5077 |
| | | | | 718/1 |
| 2012/0041752 A1* | 2/2012 | Wang | .................... | G06F 3/0237 |
| | | | | 704/2 |
| 2012/0042145 A1* | 2/2012 | Sehr | ........................ | G06F 21/53 |
| | | | | 711/163 |
| 2012/0102483 A1* | 4/2012 | Goldman | .................. | G06F 8/36 |
| | | | | 717/174 |
| 2012/0102485 A1* | 4/2012 | Goldman | .................. | G06F 8/64 |
| | | | | 717/176 |
| 2012/0297492 A1* | 11/2012 | Court | .................... | H04L 63/102 |
| | | | | 726/29 |
| 2012/0304044 A1* | 11/2012 | Leithead | .................. | G06F 40/14 |
| | | | | 715/205 |
| 2013/0055256 A1* | 2/2013 | Banga | .................. | G06F 9/5077 |
| | | | | 718/1 |
| 2013/0104120 A1* | 4/2013 | Arrizza | .................. | G16H 70/40 |
| | | | | 717/173 |
| 2013/0111584 A1* | 5/2013 | Coppock | ............... | H04L 63/145 |
| | | | | 726/22 |
| 2013/0138895 A1* | 5/2013 | McCallum | .......... | G06F 9/45529 |
| | | | | 711/147 |
| 2013/0198266 A1* | 8/2013 | Kiley | ...................... | H04L 67/34 |
| | | | | 709/203 |
| 2013/0219411 A1* | 8/2013 | Meeker | ................... | G06F 9/541 |
| | | | | 719/313 |
| 2013/0227354 A1* | 8/2013 | Shah | ....................... | G06F 11/362 |
| | | | | 714/48 |
| 2014/0102455 A1* | 4/2014 | D'Angelo | ......... | A61M 16/0051 |
| | | | | 128/204.23 |
| 2014/0282392 A1* | 9/2014 | Shukla | ............... | G06F 9/45529 |
| | | | | 717/116 |
| 2014/0365862 A1* | 12/2014 | Qu | ............................ | G06F 8/30 |
| | | | | 715/234 |
| 2015/0007142 A1* | 1/2015 | Biffle | ...................... | G06F 21/54 |
| | | | | 717/126 |
| 2015/0143374 A1* | 5/2015 | Banga | ................... | G06F 9/5077 |
| | | | | 718/1 |
| 2015/0193286 A1* | 7/2015 | Michael | .............. | G06F 9/45512 |
| | | | | 719/313 |
| 2015/0278513 A1* | 10/2015 | Krasin | .................. | G06F 9/4881 |
| | | | | 726/30 |
| 2016/0050253 A1* | 2/2016 | Michael | .................. | H04L 67/10 |
| | | | | 726/1 |
| 2016/0092339 A1* | 3/2016 | Straub | ................. | H04L 67/2814 |
| | | | | 717/124 |
| 2016/0105319 A1* | 4/2016 | Meeker | ................. | H04L 41/082 |
| | | | | 709/204 |
| 2016/0274999 A1* | 9/2016 | Florez-Larrahondo | ..................... | |
| | | | | H04L 67/10 |
| 2017/0116410 A1* | 4/2017 | Wajs | ......................... | G06F 8/70 |
| 2017/0142184 A1* | 5/2017 | Fausak | ................ | H04L 67/1002 |
| 2017/0168783 A1* | 6/2017 | Liu | ............................ | G06F 8/34 |
| 2018/0129519 A1* | 5/2018 | Bharadwaj | ............. | H04L 67/10 |
| 2019/0138712 A1* | 5/2019 | Margiolas | .............. | G06N 20/00 |
| 2019/0188015 A1 | 6/2019 | Sukhyani | | |
| 2019/0308104 A1* | 10/2019 | Nicolades | ............... | A63F 13/60 |

OTHER PUBLICATIONS

Bennet Yee et al., Native Client: A Sandbox for Portable, Untrusted x86 Native Code, May 17-20, 2019, [Retrieved on Nov. 24, 2020]. Retrieved from the internet: <URL: https://dl.acm.org/doi/pdf/10.1145/1629175.1629203> 9 pp. 91-99 (Year: 2009).*

Sukhyani, U.S. Appl. No. 15/880,344, filed Jan. 25, 2018, Office Action, dated Dec. 11, 2018.

Sukhyani, U.S. Appl. No. 15/880,344, filed Jan. 25, 2018, Notice of Allowance, dated May 28, 2019.

Sukhyani, U.S. Appl. No. 15/880,344, filed Jan. 25, 2018, Interview Summary, dated Feb. 28, 2019.

Yee et al., "Native Client: A Sandbox for Portable", Untrusted x86 Native Code, dated 2009, IEEE, pp. 79-93.

Ansel et al., "Language-Independent Sandboxing of Just-in-time Compilation and Self-modifying Code", dated Jun. 2011, 12 pages.

\* cited by examiner

NATIVE EXECUTION BRIDGE FOR SANDBOXED SCRIPTING LANGUAGES

BENEFIT CLAIM

This application claims the benefit under 35 U.S.C. § 120 as a continuation of U.S. patent application Ser. No. 15/880,344 filed Jan. 25, 2018, now U.S. Pat. No. 10,394,584, which claims the benefit under 35 U.S.C. § 119(e) of U.S. provisional patent application No. 62/607,109 filed Dec. 18, 2017, the entire contents of each of which are hereby incorporated by reference as if fully set forth herein.

FIELD OF THE DISCLOSURE

The techniques described herein relate to native execution of scripting languages, and in particular to native execution bridges for sandboxed scripting languages.

BACKGROUND

Computer applications are ubiquitous in the daily lives of many. Rarely does an hour pass without interacting with at least one computer program on at least one device. That device may be your phone, computer, television, automobile, bank machine, etc. An issue with these applications, though, is that they lack scalability of features. The companies developing the programs want to deliver more features to the users (or have third parties deliver those additional features), and the users of the programs want to receive more features. The issue is, however, that including all features in a program initially can be prohibitive in terms of application size (e.g., megabytes or gigabytes of memory needed) and application adaptability (for later-developed objects that could run with the application). One solution would be to deliver new or additional features after a program has been installed would be to allow for JavaScript objects to be run in the application, and to deliver new features as JavaScript objects. This approach presents its own challenges. For example, with this approach new JavaScript objects running within the application do not run natively, but instead run in a JavaScript Core (or other JavaScript execution environment) within the application and are therefore inefficient (e.g., in terms of computing power) and limited (e.g., to commands available in the JavaScript Core).

The techniques described herein address those issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
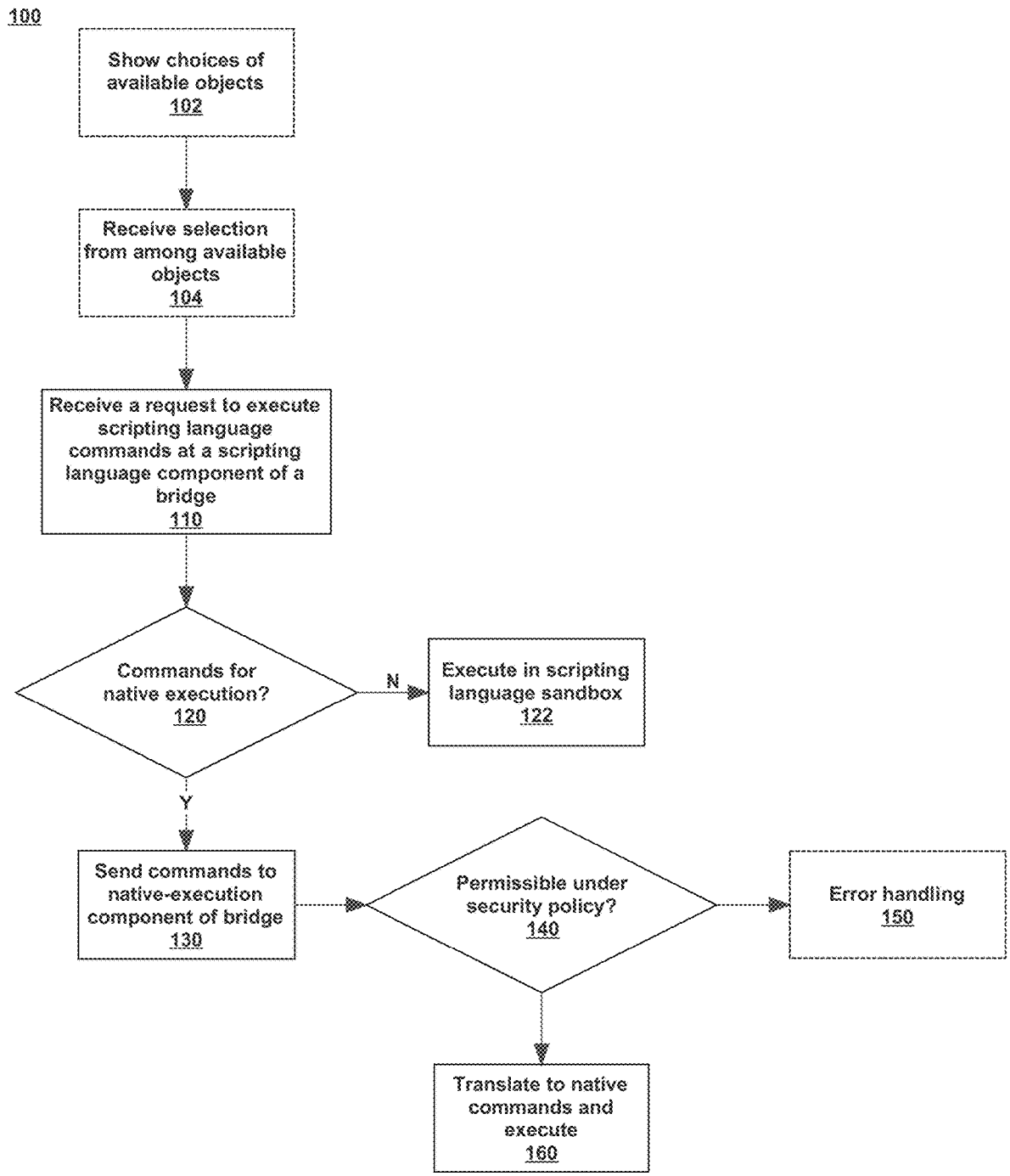
FIG. 1A and FIG. 1B depict example processes for native execution of allowable commands translated from scripting language objects running in a scripting language sandbox.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

General Overview

As noted above, applications often have scalability issues. Even if an application allows for loading and execution of JavaScript (or other scripting language) programs or objects, there is an issue with inefficiency (e.g., because the computer programs run on an interpreter and are not as fast as natively-executing commands) and/or access to commands or memory (e.g., because JavaScript and other interpreters limit access to natively executable commands and memory).

A system may be developed to allow native execution on mobile devices of some commands from JavaScript by use of a bridge from the JavaScript Core to a native execution component. Commands in JavaScript are executed in the JavaScript environment of a native application, and the bridge translates some of the commands to native commands, thereby improving the efficiency of the execution of those commands. This native execution may allow for more efficient execution of commands written in JavaScript. The issue with this approach is, however, that there is no way to differentiate the access provided among the scripting objects running in the JavaScript environment. That is, each JavaScript object running has access to all of the native commands that the hosting application has via the simple bridge. This is an important issue because, for example, if one allows the loading of JavaScript components programmed by others (third parties), there is no limit to the commands, memory, etc. to which those programs have access.

Consider an application deployed to a smartphone with a such a bridging scripting language environment running in the application, and the bridging scripting language environment allows the loading of third-party plug ins. If the application running on the smart phone has access to critical memory (e.g., contacts) and/or sensors (e.g., the camera), then the third-party plugins running in the bridging scripting language environment would also have access to the memory and/or sensors. This can cause security and other issues.

The techniques herein overcome these issues.

The techniques herein provide a scripting language environment or "sandbox" running within the native application. The scripting language sandbox may have therein a component that acts as a bridge between the scripting objects running in the scripting language sandbox and a native execution component running outside of the scripting language sandbox. The scripting language component of the bridge running in the scripting language sandbox may communicate with the native execution portion of the bridge in order to pass commands scripting language programs running in the sandbox to be translated and executed natively by the native execution component of the bridge.

In some embodiments, the native execution component will check a security policy associated with the scripting language program executing in the sandbox in order to determine whether the particular commands the scripting language program is attempting to execute are permissible for the scripting language program. For example, the scripting language object may be a newly-downloaded third-party object related to billing running within a support ticket application running on a phone. The billing object may have been permitted access to the contacts on the phone, but not the camera or global positioning system (GPS). Notwithstanding that the support ticket application may have access to the camera and GPS, if the billing object attempts to access the camera or GPS it will be denied because its security policy does not allow for such access. In some embodiments, the limitation on execution of impermissible commands is handled by the native execution component of the bridge (e.g., by not translating and executing those commands when received from the scripting sandbox portion of the bridge). In some embodiments, the limitation on execution of impermissible commands is handled by the scripting language component of the bridge, in which case the scripting language component may delete, disregard, or otherwise not pass on for execution commands that are impermissible for the scripting language object.

The techniques herein are particularly beneficial as they allow for new scripting language objects (and corresponding features) to be added to programs without performing many of the traditional tasks, such as compiling every possible feature into the application before distribution. This is beneficial because an application with all features already compiled in would be unduly cumbersome, adding many features that only some users would actually want included. These techniques also overcome the issue with the approach of allowing loading of objects to run in a JavaScript environment. Objects running in JavaScript environments are inherently limited in terms of efficiency since they are interpreted on the fly by the JavaScript environment. Objects running in JavaScript are also inherently limited in terms of the availability of access to the memory and commands on the device on which they run. These techniques also overcome the issues with systems such as React Native. Since React Native is built to allow first-party developers a way to write in JavaScript, there are no security measures associated with objects running in React Native. Therefore, it could be very dangerous to use a React Native object written by someone else since it would have no limitation on access to memory or commands.

Figure 1B:
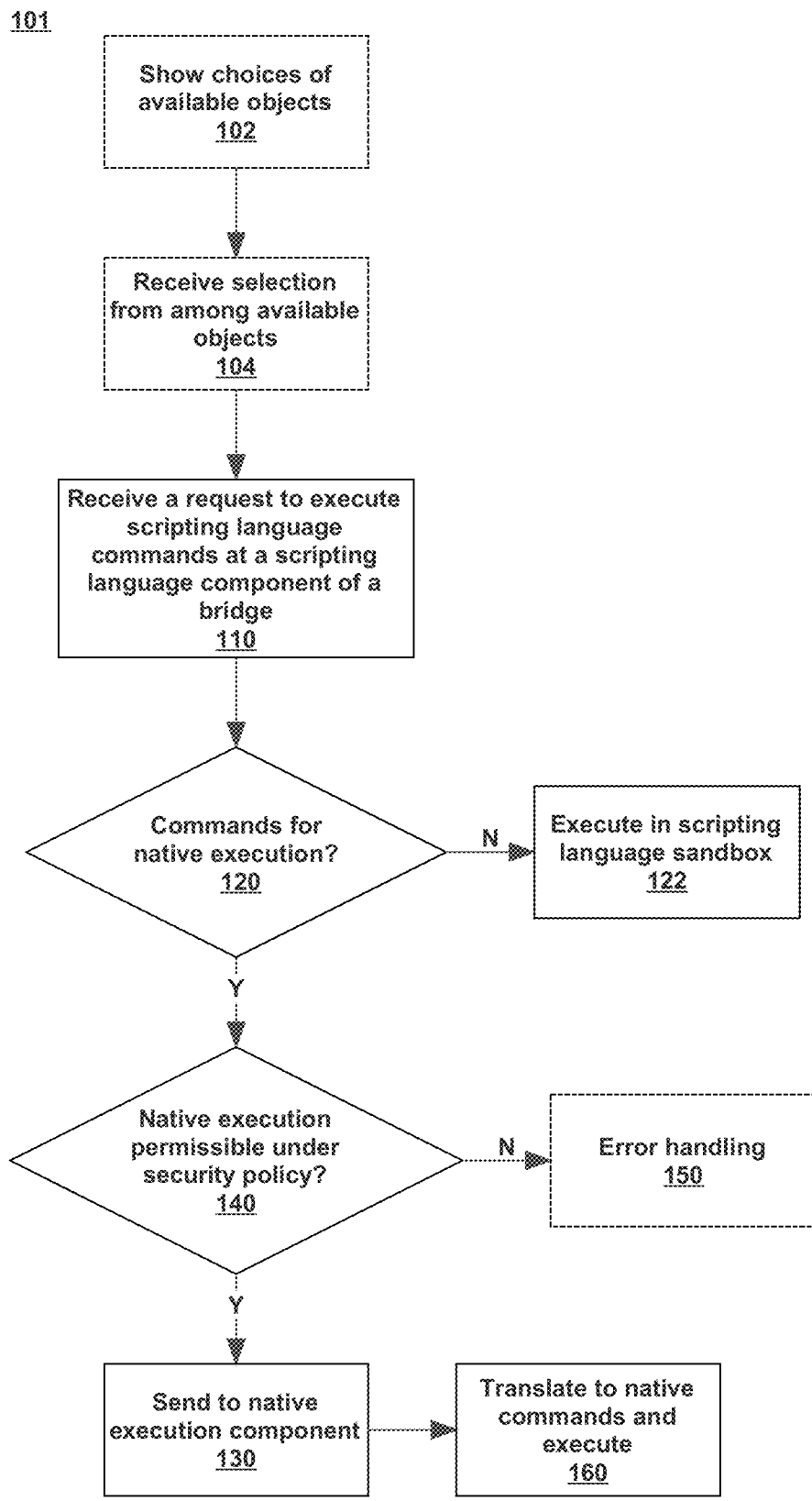

Processes for Translation and Native Execution of Scripting Language Programs Using a Bridge FIG. 1A and FIG. 1B depict example processes 100 and 101 for native execution of allowable commands translated from scripting language objects running in a scripting language sandbox. As an overview, process 100 of FIG. 1A optionally begins by showing 102 a choice of available objects that can run as part of a natively-executing program (e.g., as part of application 201 running in native execution environment 200 of FIG. 2), and receiving 104 a selection of one of those objects. The selected object may be a scripting language object written by a third party and may provide functionality and features to the application 201 running in the native execution environment 200. The scripting language execution sandbox 230 may receive 110 commands to execute from a scripting object 235. If it is determined 120 that those commands are not for native execution, they may be executed 122 in the scripting language sandbox. If it is determined 120 that the commands are for native execution, they may be sent 130 from the scripting language component 220 to the native execution component 210 of the bridge 250. If the native execution component 210 of the bridge 250 determines 140 using a security policy for the scripting object 235 that the commands are permissible, then the commands are translated and executed 160. Otherwise, optional error handling 150 may occur.

Returning to the top of FIG. 1A, process 101 optionally begins by showing 102 choices of available objects for inclusion in and/or execution with a native application. Consider, for example, the natively-executing application 201 of FIG. 2, which, in some embodiments, may run on a device 320 (of FIG. 3), such as a smart phone. The natively-executing application 201 may present on the screen of the device 320 an array of choices of objects available for use with the natively-executing application 201. These may be objects written in a scripting language, and that are compatible with the natively-executing application 201, object that are available for purchase for use with the natively-executing application 201, object that have already been purchased for use with the natively-executing application 201, and/or the like. The objects available for use with the natively-executing application 201 may be provided by a developer associated with developer computer 331 and/or be available from a scripting object store 330. For example, the objects may have been developed and later uploaded from a developer computer 331 to a scripting object store 330. In some embodiments, the objects may also be provided directly from a provider computer 310 or a developer computer 331, or may be stored in and received from network based storage 340 and/or 341. In some embodiments, the scripting objects presented 102 may have associated therewith security policies that define what native actions, memory, and/or commands the object may be able to execute (discussed elsewhere herein).

As a particular example, the natively-executing application 201 may be a support ticket application and may have available objects useable with the support ticket application. The objects may be, for example related to billing for support tickets completed. One such object may provide billing components and may have a security policy indicating that it can access the contacts and email on the device using native commands. Another billing component may have a security policy allowing it to access contacts, email, global positioning system (GPS—for location confirmation of activities billed) and the camera (to take pictures of receipts and finished products).

The process 100 optionally includes receiving 104 a selection of an object from among available objects. If a user was shown 102 those objects, then the user may select one or more of those objects and then the application may receive 104 a selection from the user. The objects may then be downloaded or otherwise transferred for execution by, e.g., the scripting language execution sandbox 230 within the natively-executing application 201 (see, e.g., scripting object 235 executing within the scripting language execution sandbox 230). In some embodiments, if the natively-executing application 201 is executing on device 320 of FIG. 3, then a selection shown 102 on the display of device 320 may have been selected by a user and the natively-executing application 201 (running on device 320) may receive 104 the selection of an object and download that scripting object (e.g., from scripting object store 330) to the device 320 to be run in the scripting language execution sandbox 230. Returning to the example above, the support ticket application may present a list of available or previously-purchased objects, such as the two billing objects, and a user may select one (or both) of those objects within the application, and the support ticket application may receive 104 that selection.

In some embodiments, if optional steps 102 and 104 are omitted, the process 100 begins by receiving 110 a request to execute a scripting language commands at a scripting language component of a bridge. In some embodiments, the process 100 receives 110 the request to execute the scripting language commands after the receipt 104 of selection of a scripting object, and the scripting language commands are from the selected object. The scripting object, however, may have been received, imported, downloaded, or obtained in any appropriate manner (e.g., installed from the memory of the device 320 on which the natively-executing application 201 is executing, automatically uploaded from a provider computer 310 or the like).

Once an object is in the scripting language execution sandbox 230 of the natively-executing application 201, it will attempt to execute, which can cause receipt 110 of the request to execute the scripting language commands at the scripting language execution sandbox 230. The request can then be assessed in order to determine 120 whether it is for local script interpretation or for native execution. If the received 110 commands are not determined 120 to be for native execution, e.g., if they are commands that can be executed by the scripting environment, then they are executed 122 in the scripting language execution sandbox 230. Executing scripting language commands may include interpreting the commands and having the scripting language execution sandbox 230 executing the interpretation. As discussed elsewhere herein, the scripting language execution sandbox 230 (such as a JavaScript core or JSC) may limit access to memory and/or commands that would be available for native execution. For example, the JSC may not provide to scripting object any access to the GPS, contacts, email, memory, and/or a number of other commands and aspects of a device 320. Thus, in order to obtain more thorough access, a scripting object 235 may have to utilize the script language component 220 of the bridge to communicate with the native execution component 210 of the bridge in order to obtain the better access to the device's 320 capabilities.

If the received 110 commands are determined 120 to be for native execution, then they are sent 130 from the script language component 220 of the bridge 250 to the native execution component 210 of the bridge 250. Sending 130 from the script language component 220 to the native execution component 210 can be via any appropriate manner or protocol, including calling an application program interface; or via a protocol over TCP/IP, HTTP(S), FTP, etc. For example, in some embodiments, the native execution component 210 and the script language component 220 are the embodied in the same program and are only conceptually distinct, in which case the commands are not actually sent 130, but instead, are simply shared within that common program. For example, the bridge 250 may be a single program or be part of a single program, and the script language component 220 and the native execution component 210 may be conceptual or components of the bridge 250 running in a single program.

The commands are checked 140 against the security policy for the object to see if they are permissible for native execution. As discussed additionally elsewhere herein, each scripting object might have its own security policy, and commands that the object is attempting to have executed natively may be checked against the policy. Returning to the example discussed elsewhere herein, there may be two billing objects available for a support ticket system, one with access to contacts and email (useful for contacting people related to the ticket for billing purposes), and the other may have access to GPS and the camera (useful for confirming location of work performed and taking pictures of receipts and completed jobs) as well as the contacts and email. Each object would have a security policy reflecting those permissions. If, for example, the first scripting object, which only has access to email and contacts, attempts to access GPS location data, then those commands would fail when checked 140 against the security policy for that scripting object.

If it is determined 140 that the commands are permissible, they are translated and executed 160. In some embodiments, the native execution component 210 of the bridge will perform the translation of the commands determined 140 to be permissible, though the translation of the commands could be performed by another component not pictured in FIG. 2. Translation of commands might be a one-to-one mapping of commands. For example, a "print" command in the scripting language may translate to a similar native command. Additionally, some commands may map to more than one native command, and other sets of more than one scripting language command may map to a single native command. In some embodiments, a bridge's translation components could be that implemented as part of React Native, and utilize the bridge translation made available by React Native.

If it is determined 140 that the commands are not permissible under the security policy, then, optionally, the script language component 220, the native execution component 210 or other element of application 201 may perform error handling 150. The error handling 150 may take any appropriate form, such as returning an exception to the calling scripting object, flagging the attempted execution prohibited by the policy, prompting a user of a device on which the program is running that unpermitted access was attempted (e.g., including the type of access attempted and the scripting object that attempted it), logging the error, and/or failing silently while not executing the requested native command. For example, if a scripting object 235 attempts to print to the screen of a device 320, that error may not be flagged at all, while the attempting printing to the screen may not happen. If, on the other hand, the scripting object 235 attempts to access the contacts on a device and it does not have permission, that may be flagged for review by the provider of the original application 201 since it may represent phishing or other nefarious behavior.

Returning to the support ticket application example with the two billing scripting objects, if the first billing object (with just permissions to email and contacts) had been chosen and loaded to the scripting language execution sandbox 230, and if it attempted to have a command performed natively to which it did not have permission (e.g., accessing the microphone of device 320), then the attempt would be determined 140 impermissible. The impermissible attempt may optionally have error handling 150 performed (e.g., by the scripting language execution sandbox 230) such as flagging the error for review by the provider of the application 201. If the billing object attempts to have a command natively executed to access email (and it does have permission for such commands), then the attempt would be determined 140 permissible and the command would be translated and executed 160 by the native execution component 210 of the bridge 250.

Additional Processes

The features of process 100 are presented in a particular order and are discussed as being performed by particular hardware and/or system elements. There are numerous different embodiments of the process consistent with the spirit of the techniques disclosed herein. For example, returning to FIG. 1B, process 101 progresses in some manners similar to process 100. Similar features, activities, and steps are numbered similarly in FIG. 1A and FIG. 1B. A primary difference between process 100 and process 101 is where and when the determination is made as to whether natively-executing commands would be permissible for a particular scripting object 235. In process 101 of FIG. 1B, that check is made by the scripting language component 220 of the bridge 250 (as opposed to by the native execution component 210 in process 100), and the determination is made before sending commands from the script language component 220 to the native execution component 210 of the bridge 250. This change necessitates a few other changes, which are discussed below.

Where process 100 and process 101 are similar, the discussion of those aspects of process 101 are not repeated here and should be considered similar to or parallel with those for process 100. For example, optionally showing 102 choices of objects and receiving 104 a selection of a choice of a scripting object are similar in process 101 to what is described for process 100. Receiving 110 the request to execute scripting language commands; the determination 120 of whether the commands require native execution; and, when they do not require native execution, executing 122 the scripting language commands in the scripting language sandbox are all similar in processes 100 and 101 and discussion of each is not reiterated here.

If it is determined 120 that native execution of commands is requested, then the scripting language component 220 determines 140 whether the requested commands are permissible for native execution under the security policy for the scripting object. Although the determination 140 is made by the script language component 220 in process 101 as opposed to by the native execution component 210 of the bridge, the determination 140 of process 101 parallels that of process 100. For example, each scripting object might have its own security policy, and the script language component may check the commands that the object is attempting to have executed natively against the policy. If the script language component 220 determines that the security policy for the object states that execution of the requested objects is permissible, then the commands are sent 130 to the native execution component for translation and execution 160, and both the sending 130 of the commands from the script language component 220 to the native execution component 210 and the translations and execution 160 of the commands by the native execution component 210 are similar for process 101 to what is described above with respect to process 100.

If the script language component 220 of the bridge 250 determines 140 that the commands are impermissible under the policy for the object, then the process 101 may optionally perform error handling 150 similar to the error handling 150 described above for process 100.

Figure 2:
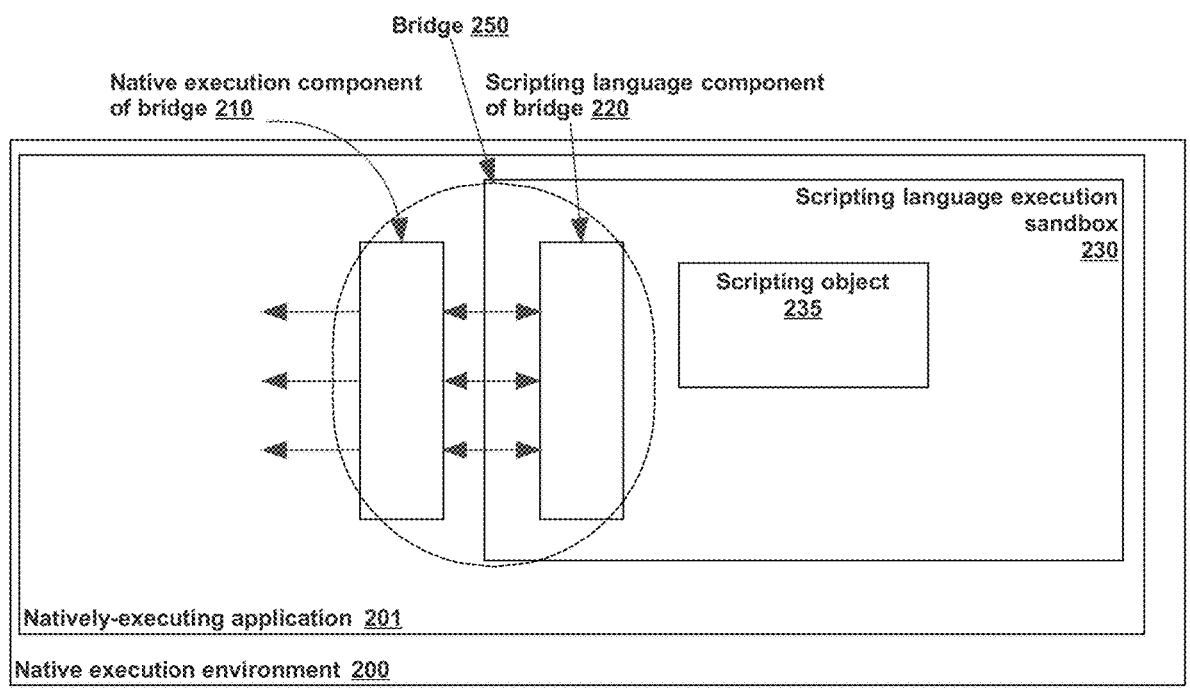
FIG. 2 depicts an example native execution environment implementing a native execution bridge for sandboxed scripting language programs.

Example Bridge for Translation and Native Execution of Scripting Language Programs FIG. 2 depicts an example native execution environment implementing a native execution bridge for sandboxed scripting language programs. A natively-executing application 201 running in a native execution environment 200. In some embodiments, the native execution environment may be an operating system running on a device, such as device 320 of FIG. 3. Natively-executing application 201 may have running therein a scripting language execution sandbox 230. In some embodiments, the scripting language execution sandbox 230 may be a JavaScript Core (JSC) or other scripting language execution environment. The scripting language execution sandbox 230 limits access of objects running therein (e.g., scripting object 235) to memory, commands, and other aspects of the native execution environment 200 and/or the device 320. The scripting language execution sandbox 230 may have one or more scripting objects 235 executing therein. When a scripting object attempts to execute a command that would cause the script language component 220 of the bridge 250 to request translation and execution by the native execution component 210 of the bridge 250, either the script language component 220 or native execution component 210 will determine whether the policy associated with the scripting object 235 would allow such a native command. If allowed, the native execution component 210 of the bridge 250 will execute (or cause execution) of the native commands on behalf of the script language component 220 and the scripting object 235.

As discussed additionally elsewhere herein, bridge 250 may have the script language component 220 and native execution component 210 running as two separate processes or programs, and the bridge 250 may be conceptual in the sense that it is the name of the two separate processes or programs together. In such embodiments, the communication between the script language component 220 and the native execution component 210 would be via application program interface, remote procedure call, etc. or via a communication mechanism such as https, SSL, FTP, TCP/IP, etc. In some embodiments, the bridge 250 and its script language component 220 and native execution component 210 are all one program, or one set of programs or functions. In this case, communication between the script language component 220 and the native execution component 210 could additionally be by procedure or function call, shared memory or variables, or the two components could be executing as a single program. The bridge 250 may also be integral to and a part of scripting language execution sandbox 230 and/or application 201.

In some embodiments, the native execution environment 200 performs some or all of processes 100 and/or 101. Further, native execution environment 200 may execute on one or more components of FIG. 3, such as on device 320 or 321.

Figure 3:
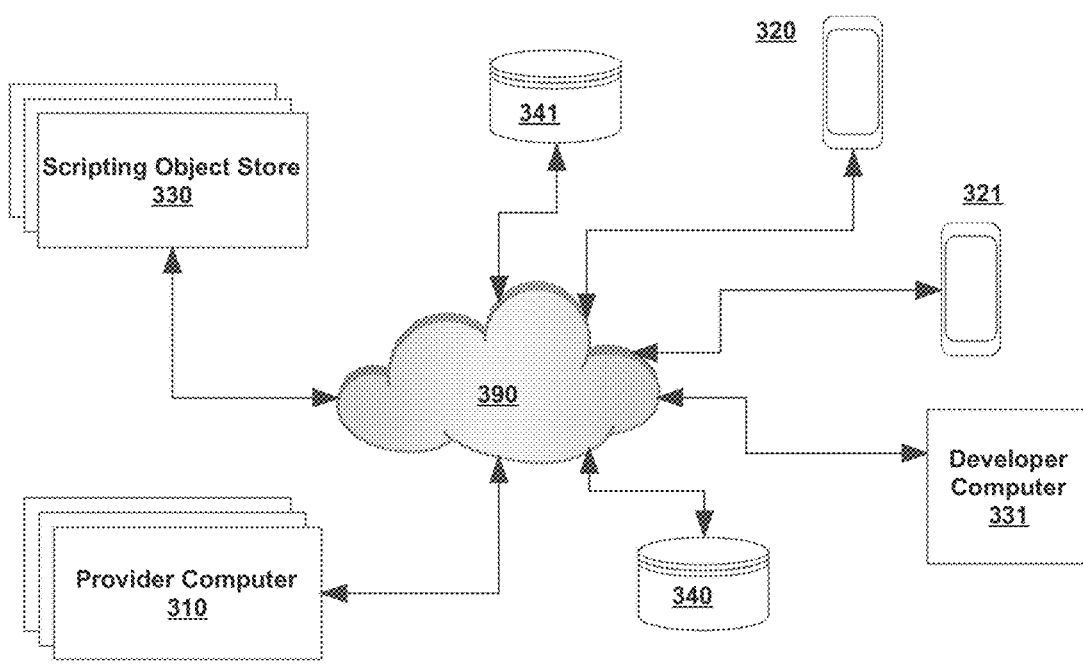
FIG. 3 depicts additional example systems implementing a native execution bridge for sandboxed scripting language programs.

System Overview for Translation and Native Execution of Scripting Language Programs FIG. 3 depicts additional example systems implementing a native execution bridge for sandboxed scripting language programs. A scripting object store 330, provider computer 310, devices 320 and 321, developer computer 331, and storage mechanism 340 and 341 may all be coupled to a network 390 and be able to communicate via the network. Each of the devices 320 and 321, scripting object store 330, developer computer 331, and provider computer 310 may run as part of the same process and/or on the same hardware (not depicted in FIG. 3), or may run separately. Further, each may run on a single processor or computing device or on multiple computing devices, such as those discussed with respect to FIG. 4 and elsewhere herein.

As discussed elsewhere herein, an application may be provided by a provider computer 310 to a device 320 or 321. That application may have scripting objects available from the scripting object store 330, where those objects were developed by programmers and provided by the developer computer 331 to the scripting object store 330. The device 320 or 321 may be used to select and download scripting objects from the scripting object store to the device 320 or 321. From there processes 100 and/or 101 may be used to determine whether and what commands attempting execution on the device 320 or 321 are permissible under the policy for the object.

As discussed herein the various processes 100 and 101, etc. may run in parallel, in conjunction, together, or one process may be a subprocess of another. Further, any of the processes may run on the systems or hardware discussed herein, including those depicted in FIG. 2, FIG. 3, and FIG. 4.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
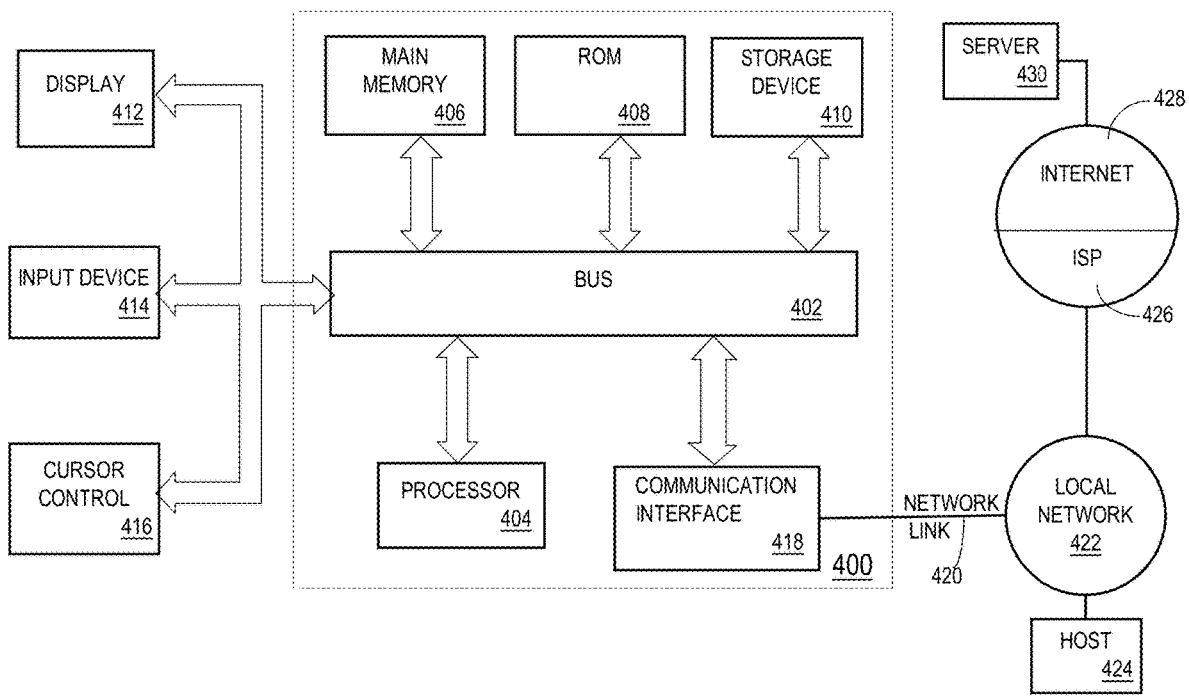
FIG. 4 depicts example hardware implementing a native execution bridge for sandboxed scripting language programs.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as an OLED, LED or cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The input device 414 may also have multiple input modalities, such as multiple 2-axes controllers, and/or input buttons or keyboard. This allows a user to input along more than two dimensions simultaneously and/or control the input of more than one type of action.

Computer system 400 may implement the techniques described herein using customized hard-wired logic, one or more ASICs or FPGAs, firmware and/or program logic which in combination with the computer system causes or programs computer system 400 to be a special-purpose machine. According to some embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method, comprising:
receiving, at a scripting language execution sandbox, a request to execute one or more scripting language commands, the scripting language execution sandbox configured to execute scripting language commands with one or more restrictions on memory access or program calls, wherein the scripting language execution sandbox includes a scripting language component communicatively coupled to a native execution component, the native execution component configured to execute native commands without the one or more restrictions on memory access or program calls;
sending the one or more scripting language commands from the scripting language component to the native execution component;
determining, using the native execution component and based at least in part on a security policy, whether to execute the one or more scripting language commands as corresponding native commands;
in response to determining to execute the one or more scripting language commands as corresponding native commands, translating the one or more scripting language commands into one or more native commands;
in response to translating the one or more scripting language commands into the one or more native commands, the native execution component causing execution of the one or more native commands;
in response to determining not to execute the one or more scripting language commands as corresponding native commands, the scripting language execution sandbox causing execution of the one or more scripting language commands by the scripting language component.

2. The method of claim 1, further comprising the scripting language component and the native execution component executing as a single program.

3. The method of claim 1, further comprising:
receiving, with the request to execute one or more scripting language commands, an indication of identity of a particular scripting language program associated with the one or more scripting language commands;
determining, by the native execution component and based at least in part on a particular security policy for the particular scripting language program, whether to execute the one or more scripting language commands as one or more native commands.

4. The method of claim 1, wherein the one or more native commands cannot be executed by the scripting language execution sandbox.

5. The method of claim 1, further comprising:
accessing for execution, using the scripting language component, a particular scripting language object that is not yet associated with a natively executable program that is executing at the native execution component;
extracting, using the scripting language component, the one or more scripting language commands from the particular scripting language object.

6. The method of claim 5, further comprising:
accessing for execution, using the scripting language component, a second scripting language object that is not yet associated with the natively executable program executing at the native execution component;
executing second one or more scripting language commands that have been extracted from the second scripting language object as one or more native commands only in response to determining, using the native execution component and based at least in part on a second security policy associated with the second scripting language object, that it is permissible to execute the second one or more scripting language commands.

7. The method of claim 5, further comprising:
receiving an input signal specifying to execute the particular scripting language object;
accessing the particular scripting language object for execution based at least in part on the received input signal.

8. The method of claim 7, further comprising:
prior to receiving the input signal, outputting a list of available scripting language objects, wherein the list of available scripting language objects includes the particular scripting language object.

9. The method of claim 1, further comprising, in response to determining not to execute the one or more scripting language commands as corresponding native commands, sending an indication of the determination not to execute the one or more scripting language commands in response to a request to translate.

10. A computing device comprising:
a memory storing executable instructions; and a processor coupled to the memory and configured to access the executable instructions from them memory to instantiate a scripting language execution sandbox configured to:
- receive a request to execute one or more scripting language commands;
- determine, based at least in part on a security policy, whether to translate the one or more scripting language commands as corresponding native commands;
- in response to determining to translate the one or more scripting language commands, send the one or more scripting language commands to a native execution component;
- in response to determining not to translate the one or more scripting language commands, causing execution of the one or more scripting language commands with one or more restrictions on memory access or program calls; wherein:
- the native execution component is configured to:
  - receive, from the scripting language execution sandbox, the one or more scripting language commands;
  - translate the one or more scripting language commands into one or more native commands;
  - cause native execution of the one or more native commands without the one or more restrictions on memory access or program calls.

11. The computing device of claim 10, wherein the scripting language execution sandbox and the native execution component are configured to execute as parts of a single program.

12. The computing device of claim 10, the scripting language execution sandbox being further configured to receive, with the request to execute one or more scripting language commands, an indication of identity of a particular scripting language program associated with the one or more scripting language commands;
the native execution component being further configured to determine, based at least in part on a particular security policy for the particular scripting language program, whether to execute the one or more scripting language commands as one or more native commands.

13. The computing device of claim 10, the scripting language execution sandbox being further configured to limit, based on the security policy, the native commands that would otherwise be executable by the native execution component.

14. The computing device of claim 10, wherein the one or more native commands cannot be executed by the scripting language execution sandbox.

15. A computing device comprising:
a memory storing executable instructions; and
a processor coupled to the memory and configured to access the executable instructions from them memory to instantiate a scripting language execution sandbox configured to:
- receive a request to execute one or more scripting language commands;
- send a first portion of the one or more scripting language commands to a native execution component;
- execute, with one or more restrictions on memory access or program calls, a second portion of the one or more scripting language commands that are not sent to the native execution component; wherein:
- the native execution component is configured to:
  - receive, from the scripting language execution sandbox, the first portion of the one or more scripting language commands;
  - determine, based at least in part on a security policy, whether to translate the first portion of the one or more scripting language commands as corresponding native commands;
  - in response to determining to translate the first portion of the one or more scripting language commands, translate the first portion of the one or more scripting language commands into one or more native commands;
  - cause native execution of the one or more native commands without the one or more restrictions on memory access or program calls.

16. The computing device of claim 15, wherein the scripting language execution sandbox and the native execution component are configured to execute as parts of a single program.

17. The computing device of claim 15, the scripting language execution sandbox being further configured to:
access for execution a particular scripting language object that is not yet associated with a natively executable program that is executing at the native execution component;
extract the one or more scripting language commands from the particular scripting language object.

18. The computing device of claim 17, the scripting language execution sandbox being further configured to access for execution a second scripting language object hat is not yet associated with the natively executable program executing at the native execution component;
the native execution component being further configured to execute second one or more scripting language commands that have been extracted from the second scripting language object as one or more native commands only in response to determining based at least in part on a second security policy associated with the second scripting language object that it is permissible to execute the second one or more scripting language commands.

19. The computing device of claim 17, wherein the scripting language execution sandbox is further configured to:
receive an input signal specifying to execute the particular scripting language object;
access the particular scripting language object for execution based at least in part on the received input signal.

20. The computing device of claim 19, the scripting language execution sandbox being further configured to, prior to receiving the input signal, output a list of available scripting language objects, wherein the list of available scripting language objects includes the particular scripting language object.

* * * * *